United States Patent
Kato et al.

(10) Patent No.: US 10,231,312 B2
(45) Date of Patent: Mar. 12, 2019

(54) LIGHTING DEVICE, LUMINAIRE, VEHICLE WITH SAME, AND CONTROL METHOD

(71) Applicant: Panasonic Intellectual Property Management Co., Ltd., Osaka (JP)

(72) Inventors: Kazuya Kato, Osaka (JP); Toshiaki Nakamura, Osaka (JP); Akihiro Kishimoto, Osaka (JP); Kenichi Fukuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/694,821

(22) Filed: Sep. 3, 2017

(65) Prior Publication Data

US 2018/0070416 A1    Mar. 8, 2018

(30) Foreign Application Priority Data

Sep. 8, 2016 (JP) ................................ 2016-175901

(51) Int. Cl.
| | |
|---|---|
| *B60Q 1/04* | (2006.01) |
| *H05B 33/08* | (2006.01) |
| *B60Q 11/00* | (2006.01) |

(52) U.S. Cl.
CPC ......... *H05B 33/089* (2013.01); *B60Q 11/005* (2013.01); *H05B 33/0848* (2013.01); *H05B 33/0854* (2013.01); *B60Q 1/04* (2013.01)

(58) Field of Classification Search
CPC ..... B60Q 11/00; B60Q 11/002; B60Q 11/005; B60Q 11/007; H05B 37/00; H05B 37/03; H05B 33/02; H05B 33/08; H05B 33/0803; H05B 33/0806; H05B 33/089; H05B 33/0893; H05B 33/0896
USPC ........................ 315/77, 80, 82, 112, 117–118
See application file for complete search history.

(56) References Cited

U.S. PATENT DOCUMENTS

| | | | | |
|---|---|---|---|---|
| 2004/0178737 | A1* | 9/2004 | Takeda .................... | B60Q 1/00 315/77 |
| 2011/0062870 | A1* | 3/2011 | Kanbara .......... | H02M 3/33507 315/77 |
| 2012/0098430 | A1* | 4/2012 | Inoue ................. | H05B 33/0893 315/82 |
| 2012/0112638 | A1* | 5/2012 | Melanson .......... | H05B 33/0815 315/117 |

(Continued)

FOREIGN PATENT DOCUMENTS

JP    2012-133938 A    7/2012

*Primary Examiner* — Jason Crawford
(74) *Attorney, Agent, or Firm* — Renner Otto Boisselle & Sklar, LLP

(57) ABSTRACT

In a lighting device, when determining that both of a first measuring value and a second measuring value are not an abnormal value, a controller is configured to control an output of a power converter based on the first and second measuring values. The first measuring value is a temperature inside a main body of the lighting device, sensed by a first temperature sensor. The second measuring value is a temperature of a light source, sensed by a second temperature sensor. When determining that at least one of the first and second measuring values is the abnormal value, the controller is configured to control the output of the power converter to another value that is different from a value of the output set based on the first and second measuring values.

20 Claims, 7 Drawing Sheets

(56) References Cited

U.S. PATENT DOCUMENTS

| | | | |
|---|---|---|---|
| 2013/0049586 A1* | 2/2013 | Hamana | H05B 33/0884 315/82 |
| 2015/0015143 A1* | 1/2015 | Inada | H05B 33/0815 315/77 |
| 2015/0069908 A1* | 3/2015 | Fukui | H05B 33/0815 315/82 |
| 2017/0305328 A1* | 10/2017 | Kato | H05B 33/0854 |

* cited by examiner

LIGHTING DEVICE, LUMINAIRE, VEHICLE WITH SAME, AND CONTROL METHOD

CROSS-REFERENCE TO RELATED APPLICATION

This application is based upon and claims the benefit of priority of Japanese Patent Application No. 2016-175901, filed on Sep. 8, 2016, the entire content of which is incorporated herein by reference.

TECHNICAL FIELD

This disclosure relates to lighting devices, luminaires, vehicles with the same, and control methods and, more particularly, to a lighting device having a function of changing an output in accordance with a temperature, a luminaire, and a vehicle with the same, and a control method.

BACKGROUND ART

Conventionally, there has been an LED module that includes light-emitting diodes, a temperature sensor disposed so that heat generated by the light-emitting diodes is applied thereto, and a protection circuit connected in parallel to a part of the light-emitting diodes (refer to a Document 1: JP 2012-133938). In the LED module disclosed in the Document 1, when a temperature sensed by the temperature sensor exceeds a prescribed threshold, the protection circuit is short-circuited so that the part of the light-emitting diodes is turned off, thereby reducing heat quantity of the light-emitting diodes.

In the above-mentioned LED module, if abnormality occurs in a function of sensing temperature, depending on a failure in the temperature sensor or the like, the protection circuit may not operate correctly, and control therefore may fall in an abnormal state.

SUMMARY

The present disclosure is directed to a lighting device, a luminaire, a vehicle with the same, and a control method, which can reduce occurrence of an abnormal control state, even when abnormality occurs in a function of sensing temperature.

A lighting device according to an aspect of the present disclosure includes: a power converter configured to convert input power to be output to a light source; a controller configured to control an output of the power converter; and a main body for housing therein at least the power converter and the controller. The controller includes a first inputter and a second inputter. The first inputter is configured to receive a first measuring value from a first temperature sensor for sensing a temperature inside the main body. The second inputter is configured to receive a second measuring value from a second temperature sensor for sensing a temperature of the light source. The controller is configured to control the output of the power converter so as to suppress a value of the output, when determining that both of the first measuring value and the second measuring value are not an abnormal value, and further when any one of the first measuring value and the second measuring value exceeds a prescribed threshold. The controller is configured to control the output of the power converter to another value that is different from the value of the output based on the first measuring value and the second measuring value, when determining that at least one of the first measuring value and the second measuring value is the abnormal value.

A luminaire according to an aspect of the present disclosure includes the lighting device and a luminaire body holding the lighting device.

A vehicle according to an aspect of the present disclosure includes the luminaire and a vehicle body to which the luminaire is attached.

A control method according to an aspect of the present disclosure is to control power provided to a light source. The control method includes: sensing a temperature inside a main body housing a controller and a power converter configured to convert input power to output power to be output to the light source; sensing a temperature of the light source; controlling the output power of the power converter provided to the light source in accordance with a first predefined relationship when both the temperature inside the main body and the temperature of the light source are not an abnormal value; and controlling the output power of the power converter provided to the light source in accordance with a second predefined relationship when at least one of the temperature inside the main body and the temperature of the light source is the abnormal value.

BRIEF DESCRIPTION OF THE DRAWINGS

The figures depict one or more implementations in accordance with the present disclosure, by way of example only, not by way of limitations. In the figures, like reference numerals refer to the same or similar elements.

DETAILED DESCRIPTION

Embodiments explained below are merely examples. The present disclosure is not limited to the following embodiments, but may include embodiments other than the following embodiments. In the following embodiments, numerous modifications and variations can be made according to designs and the like without departing from the technical ideas according to the present disclosure.

First Embodiment

Figure 1:
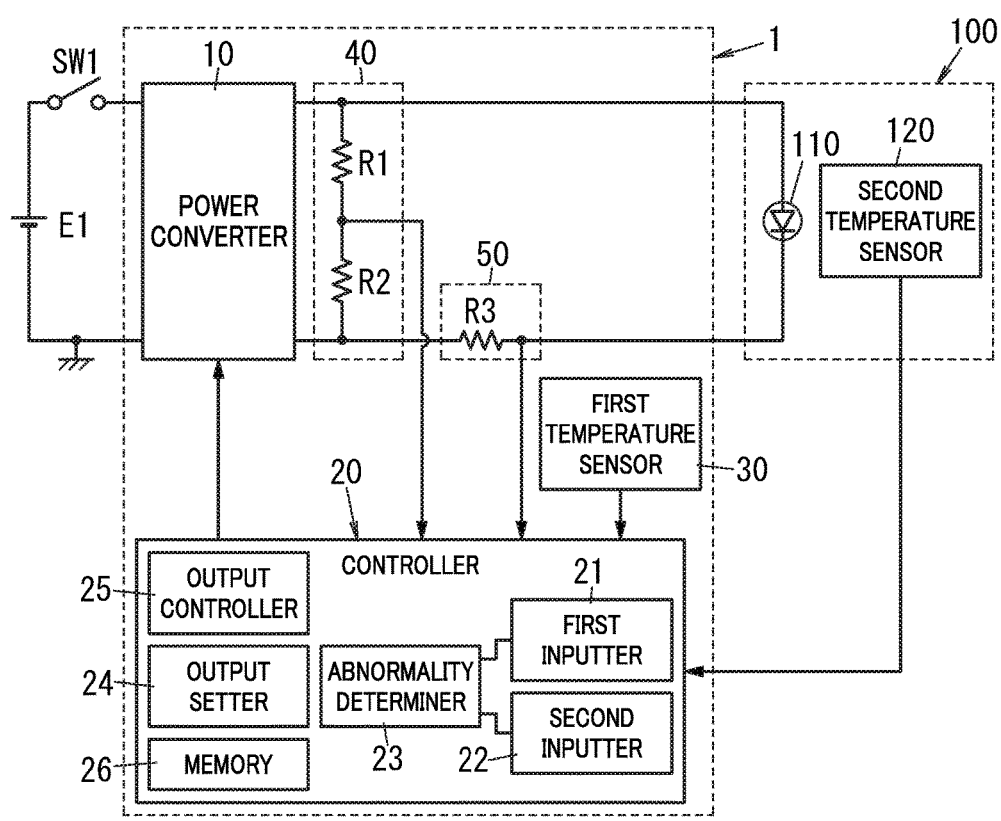
FIG. 1 is a circuit diagram of a lighting device according to a First Embodiment.

As shown in FIG. 1, a lighting device 1 according to a First Embodiment is used for causing a light source unit 100 to emit light. Note that the lighting device 1 of this embodiment is used for causing the light source unit 100, installed to a vehicle such as an automobile, to emit light.

As shown in FIG. 1, the lighting device 1 includes a power converter 10, a controller 20 and a first temperature sensor 30. The lighting device 1 further includes a voltage measuring part (circuit) 40 for measuring an output voltage and a current measuring part (circuit) 50 for measuring an output current.

First, the light source unit 100 to be lit by the lighting device 1 will be described.

The light source unit 100 includes a light source 110 and a second temperature sensor 120. The light source 110 includes a semiconductor light-emitting element(s) such as a light-emitting diode (LED). In this embodiment, the light source 110 includes e.g., LEDs, which are connected in series or in parallel. The second temperature sensor 120 is to measure a temperature of the light source 110. The "temperature of the light source" mentioned herein is not limited to a temperature of the light source itself, but includes a temperature around the light source. In this embodiment, the second temperature sensor 120 measures the temperature around the light source 110.

Next, components of the lighting device 1 will be described.

The power converter 10 includes, for example, a step-up DC-DC converter circuit. The power converter 10 converts a voltage value of DC voltage received from a DC power supply E1 via a power supply switch SW1 so as to be output to the light source 110 of the light source unit 100. The DC power supply E1 is, for example, a battery of a vehicle, but may be an AC-DC inverter circuit for rectifying and smoothing an AC voltage of an AC power supply and then converting it into a DC voltage.

The voltage measuring part 40 includes a series circuit of resistors R1 and R2, which are connected between output terminals of the power converter 10. The resistors R1 and R2 divide an output voltage of the power converter 10, and a divided voltage is input to the controller 20.

The current measuring part 50 includes a resistor R3 connected between the light source 110 and the power converter 10, the resistor R3 being in series to the light source 110. A voltage across the resistor R3 is input to the controller 20.

The controller 20 has functions of a first inputter 21, a second inputter 22, an abnormality determiner 23, an output setter 24 and an output controller 25. The controller 20 further includes a memory 26. The controller 20 of this embodiment includes a micro-computer. A Central Processing Unit (CPU) of the micro-computer executes a program(s) stored in the memory 26, and thereby the functions of the controller 20 described herein may be realized. In this case, the program(s) to be executed by the CPU of the micro-computer may be previously stored in the memory 26 in time of factory shipment of the lighting device 1, or may be recorded and provided in a storage medium such as a memory card. Alternatively, the program(s) may be provided through an electric telecommunication line.

The first inputter 21 is configured to receive a first measuring value from a first temperature sensor 30 for sensing a temperature inside a main body 70 of the lighting device 1 (refer to FIG. 7), which houses therein at least the power converter 10 and the controller 20, namely, a temperature of the lighting device 1. The first temperature sensor 30 is a thermosensitive element such as a thermistor, and is mounted on a substrate, where circuits such as the power converter 10 and the like are mounted, in order to measure the temperature inside the main body 70. The "temperature inside the main body" mentioned herein means a temperature at an arbitrary position inside the main body 70, and, for example, the first temperature sensor 30 may be disposed to measure a temperature near a circuit component with relatively large heat quantity.

The second inputter 22 is configured to receive a second measuring value from the second temperature sensor 120 for sensing a temperature of the light source 110. The second temperature sensor 120 is a thermosensitive element such as a thermistor, and is mounted on a substrate, where the light-emitting diodes as the light source 110 are mounted, in order to measure a temperature around the light source 110. In this embodiment, the second temperature sensor 120 measures the temperature around the light source 110, but may directly measure a temperature of the light source 110 itself.

The abnormality determiner 23 is configured to determine whether or not the first measuring value input to the first inputter 21 and the second measuring value input to the second inputter 22 are each an abnormal value. The matter that "the first measuring value is the abnormal value" mentioned herein means that the first measuring value falls into an abnormal value, apart from an actual temperature inside the main body 70, depending on a failure of a circuit component, disconnection or the like occurring in the first temperature sensor 30 or in a circuit receiving the first measuring value from the first temperature sensor 30. Similarly, the matter that "the second measuring value is the abnormal value" means that the second measuring value falls into an abnormal value, apart from an actual temperature of the light source 110, depending on a failure of a circuit component, disconnection or the like occurring in the second temperature sensor 120 or in a circuit receiving the second measuring value from the second temperature sensor 120. Accordingly, as long as the first and second measuring values are values normally measured, their values are not the abnormal value, even when their values are outside of an application temperature range of the lighting device 1 and the light source 110. In the following explanation, the matter that at least one of the first and second measuring values falls into the abnormal value is also referred to as that "abnormality occurs in measurement" for convenience of explanation.

For example, when the first measuring value input to the first inputter 21 falls outside of a prescribed first temperature range, the abnormality determiner 23 determines that the first measuring value is the abnormal value. The first temperature range mentioned herein means a range of values which the first measuring value can take, while the first temperature sensor 30 and a circuit receiving the first measuring value from the first temperature sensor 30 (the first inputter 21; an electric wire connecting the first inputter 21 and the first temperature sensor 30; and the like) normally function. In this embodiment, the first temperature range is set to, for example, a temperature range from −40° C. to 135° C., and the abnormality determiner 23 therefore determines that the first measuring value is the abnormal value, when it is less than −40° C. or more than 135° C.

Also, when the second measuring value input to the second inputter 22 falls outside of a prescribed second temperature range, the abnormality determiner 23 determines that the second measuring value is the abnormal value. The second temperature range mentioned herein means a range of values which the second measuring value can take, while the second temperature sensor 120 and a circuit receiving the second measuring value from the second temperature sensor 120 (the second inputter 22; an electric wire connecting the second inputter 22 and the second temperature sensor 120; and the like) normally function. In this embodiment, the second temperature range is set to, for example, a temperature range from −40° C. to 135° C., and the abnormality determiner 23 therefore determines that the second measuring value is the abnormal value, when it is less than −40° C. or more than 135° C.

In an explanation of a comparison of two values such as temperatures or the like, a term of "equal to or more than" is used, which means both of a case where the two values are equal to each other and a case where one of the two values exceeds the other thereof, but it is not limited to the term. The term of "equal to or more than" mentioned herein may be technically synonymous with a term of "more than" that means only the case where one of the two values exceeds the other thereof. That is, whether or not the case where the two values are equal to each other is included can be arbitrarily changed according to setting of a reference value or the like. Thus, there is no technical difference between the terms of "equal to or more than" and "more than" mentioned herein. Similarly, a term of "equal to or less than" mentioned herein may be technically synonymous with a term of "less than", and there is no technical difference between the terms of "equal to or less than" and "less than" mentioned herein.

The memory 26 is an electrically rewritable nonvolatile memory, such as an Electrically Erasable and Programmable Read-Only Memory (EEPROM). The memory 26 stores: the program(s) to be executed by the CPU of the micro-computer; data of output characteristics representing a relation between the temperature of the lighting device 1 and a value of an output of the power converter 10 and a relation between the temperature of the light source 110 and the value of the output of the power converter 10; and the like.

Figure 2A:
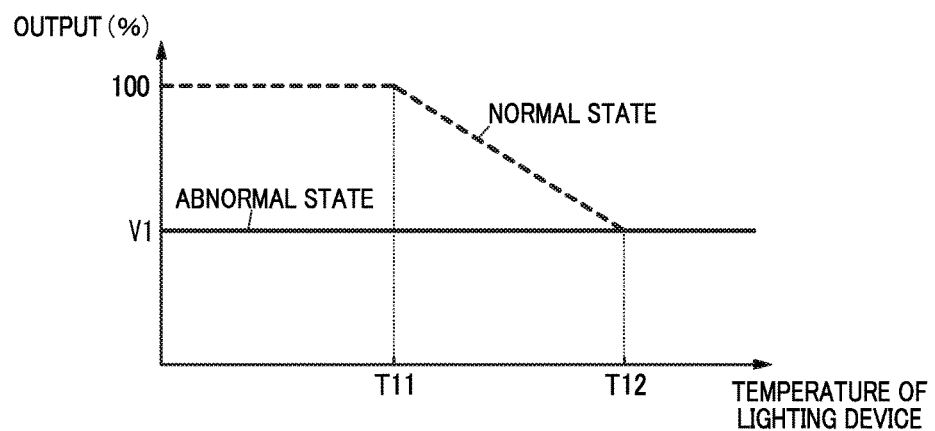
FIG. 2A is a graph illustrating a relation between a temperature and an output of the lighting device.

FIG. 2A shows the relation between the temperature of the lighting device 1 and the value of the output of the power converter 10. In FIG. 2A, the output of the power converter 10 is represented as a percentage, when a rated output thereof to the light source 110 is defined as 100 [%]. In FIG. 2A, the output characteristic when the first measuring value is not the abnormal value is expressed by a dotted line (hereinafter, it is referred to as a "normally output characteristic") (i.e., an output characteristic in a normal state). In the normally output characteristic (a first predefined relationship), while the temperature of the lighting device 1 is equal to or less than a temperature T11, a setting value of the output of the power converter 10 is set to 100 [%]. While the temperature of the lighting device 1 is more than the temperature T11 and equal to or less than a temperature T12, the setting value of the output of the power converter 10 is set such that the output is monotonously decreased, depending on an increase in the temperature. When the temperature of the lighting device 1 exceeds the temperature T12, the setting value of the output of the power converter 10 is set to V1 [%]. Moreover, in FIG. 2A, the output characteristic when the first measuring value is the abnormal value is expressed by a solid line (hereinafter, it is referred to as an "abnormally output characteristic") (i.e., an output characteristic in an abnormal state). In the abnormally output characteristic (a second predefined relationship), regardless of the temperature of the lighting device 1, the setting value of the output of the power converter 10 is set to V1 [%]. In this case, the setting value V1 is preferably set to a value of the output so that even when an ambient temperature is increased, the temperatures of the lighting device 1 and the light source 110 fall into an allowable range.

Figure 2B:
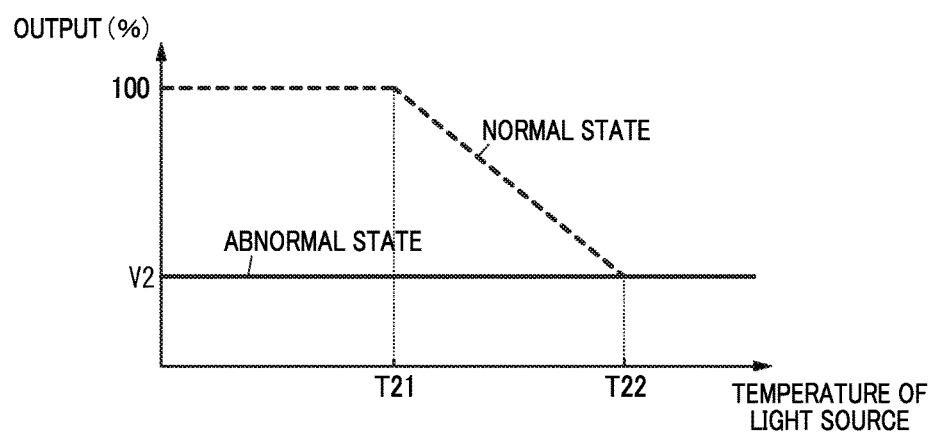
FIG. 2B is a graph illustrating a relation between a temperature and an output of a light source.

On the other hand, FIG. 2B shows the relation between the temperature of the light source 110 and the value of the output of the power converter 10. In FIG. 2B, the output of the power converter 10 is represented as a percentage, when a rated output thereof to the light source 110 is defined as 100 [%]. In FIG. 2B, a normally output characteristic is expressed by a dotted line. In the normally output characteristic (the first predefined relationship), while the temperature of the light source 110 is equal to or less than a temperature T21, a setting value of the output of the power converter 10 is set to 100 [%]. While the temperature of the light source 110 is more than the temperature T21 and equal to or less than a temperature T22, the setting value of the output of the power converter 10 is set such that the output is monotonously decreased, depending on an increase in the temperature. When the temperature of the light source 110 exceeds the temperature T22, the setting value of the output of the power converter 10 is set to V2 [%]. Moreover, in FIG. 2B, an abnormally output characteristic is expressed by a solid line. In the abnormally output characteristic (the second predefined relationship), regardless of the temperature of the light source 110, the setting value of the output of the power converter 10 is set to V2 [%]. In this case, the setting value V2 is preferably set to a value of the output so that even when an ambient temperature is increased, the temperatures of the lighting device 1 and the light source 110 fall into an allowable range.

While the first and second measuring value are determined to be not the abnormal value by the abnormality determiner 23, the output setter 24 sets the value of the output of the power converter 10 so that the output is reduced at a high temperature based on the first and second measuring values. When the abnormality determiner 23 determines that the first measuring value is the abnormal value, the output setter 24 sets the output of the power converter 10 to the setting value V1. When the abnormality determiner 23 determines that the second measuring value is the abnormal value, the output setter 24 sets the output of the power converter 10 to a setting value V2. When the abnormality determiner 23 determines that both of the first and second measuring values are the abnormal value, the output setter 24 sets the output of the power converter 10 to a smaller one of the setting values V1 and V2. If the setting values V1 and V2 are equal to each other, the output setter 24 sets the output of the power converter 10 to the setting value V1 (=V2), when the abnormality determiner 23 determines that both of the first and second measuring values are the abnormal value.

The output controller 25 controls a duty ratio (an on-duty) of a switching element(s) (not shown) of the power converter 10 so that the output of the power converter 10 matches the setting value set by the output setter 24.

Next, operation of the lighting device 1 of this embodiment will be described.

When the power supply switch SW1 is turned on and the power is accordingly supplied from the DC power supply E1 to the lighting device 1, the lighting device 1 starts operation. The controller 20 has a communication function for communicating with an external device, such as an Electronic Control Unit (ECU) of a vehicle. While the controller 20 receives no command for lighting the light source unit 100 from the ECU, the controller 20 maintains a non-lighting state of the light source unit 100.

When receiving the command for lighting the light source unit 100 from the ECU, the controller 20 controls the power converter 10 so that a prescribed output is supplied to the light source 110, thereby causing the light source 110 to emit light at a predetermined light output. Furthermore, the controller 20 monitors the temperature inside the main body 70 and the temperature of the light source 110, and starts operation for suppressing the output of the power converter 10, when any one of those temperatures becomes high. Hereinafter, operation of the controller 20 when causing the light source unit 100 to emit light will be described.

The first inputter 21 of the controller 20 periodically takes in the first measuring value from the first temperature sensor 30. The second inputter 22 of the controller 20 periodically takes in the second measuring value from the second temperature sensor 120. When the first and second measuring values are input from the first and second temperature sensors 30 and 120 to the first and second inputters 21 and 22 of the controller 20, respectively, the abnormality determiner 23 determines whether or not the first and second measuring values are each the abnormal value. In this case, if the first and second measuring values are within the first and second temperature ranges, respectively, the abnormality determiner 23 determines that those are not the abnormal value. On the other hand, if the first measuring value is outside of the first temperature range, the abnormality determiner 23 determines that it is the abnormal value. Also, if the second measuring value is outside of the second temperature range, the abnormality determiner 23 determines that it is the abnormal value.

The output setter 24 sets the value of the output of the power converter 10 in accordance with a determination result of the abnormality determiner 23.

When the abnormality determiner 23 determines that both of the first and second measuring values are not the abnormal value, the output setter 24 calculates, based on the first measuring value, a candidate value of the output of the power converter 10 (hereinafter, referred to as a first candidate value) according to the normally output characteristic shown in FIG. 2A, obtained from the memory 26. Also, the output setter 24 calculates, based on the second measuring value, a candidate value of the output of the power converter 10 (hereinafter, referred to as a second candidate value) according to the normally output characteristic shown in FIG. 2B, obtained from the memory 26. The output setter 24 compares the first and second candidate values in magnitude, and uses a smaller one of the first and second candidate values, as the setting value of the output of the power converter 10. Note that if the first and second candidate values are equal to each other, the output setter 24 sets the first candidate value (the second candidate value), as the setting value of the output of the power converter 10.

When the abnormality determiner 23 determines that only the first measuring value is the abnormal value, the output setter 24 sets the output of the power converter 10 to the setting value V1.

When the abnormality determiner 23 determines that only the second measuring value is the abnormal value, the output setter 24 sets the output of the power converter 10 to the setting value V2.

When the abnormality determiner 23 determines that both of the first and second measuring values are the abnormal value, the output setter 24 sets the output of the power converter 10 to a smaller one of the setting values V1 and V2. Note that if the setting values V1 and V2 are equal to each other, the output setter 24 sets the output of the power converter 10 to the setting value V1 (the setting value V2).

The output controller 25 controls the duty ratio of the switching element(s) of the power converter 10 so that the output of the power converter 10 matches the setting value set by the output setter 24. In this embodiment, the output voltage measured by the voltage measuring part 40 and the output current measured by the current measuring part 50 are fed back to the controller 20. The controller 20 controls, based on the output voltage and the output current, the duty ratio of the switching element(s) so that the output of the power converter 10 matches the setting value set by the output setter 24.

In this way, when at least one of the first and second measuring values is the abnormal value, the controller 20 controls the output of the power converter 10 to another value that is different from the value of the output determined based on the first measuring value input to the first inputter 21 and the second measuring value input to the second inputter 22. The output of the power converter 10 is therefore not controlled to the value of the output determined based on the first or second measuring value determined to be the abnormal value, and it is accordingly possible to reduce occurrence of an abnormal control state, even when abnormality occurs in a function sensing temperature. Furthermore, even when at least one of the first and second measuring values is the abnormal value, the lighting device 1 can cause the light source 110 to emit light, and it is therefore possible to illuminate a desired area.

The controller 20 controls the output of the power converter 10 to a value of 100 [%], if the temperature of the lighting device 1 is equal to or less than the temperature T11 and the temperature of the light source 110 is equal to or less than the temperature T21, while the abnormality determiner 23 determines that both of the first and second measuring values are not the abnormal value. On the other hand, the controller 20 reduces the output of the power converter 10, if the temperature of the lighting device 1 exceeds the temperature T11, or the temperature of the light source 110 exceeds the temperature T21, while the abnormality determiner 23 determines that the both of first and second measuring values are not the abnormal value. Thus, the controller 20 controls the output of the power converter 10 so as to suppress a value of the output, when the first or second measuring value exceeds a prescribed threshold (temperature T11 or T21), and the temperatures of the lighting device 1 and the light source 110 can be accordingly suppressed from being increased.

In this embodiment, when the abnormality determiner 23 determines that abnormality occurs in measurement, the controller 20 controls the output of the power converter 10 to a fixed value, regardless of the temperature of the lighting device 1 or the temperature of the light source 110. The output of the power converter 10 is therefore not controlled to the value of the output determined based on the first or second measuring value determined to be the abnormal value, and it is accordingly possible to reduce occurrence of an abnormal control state, even when abnormality occurs in the function sensing temperature.

Variations of the lighting device 1 of the First Embodiment will be listed below. Note that the variations explained below can be applied in appropriately combination with the above embodiment.

If abnormality occurs in measurement, the output setter 24 may be configured to set the output of the power converter 10 to a value smaller than a minimum value (a smaller one of the values V1 and V2) of the output when both of the first and second measuring values are not the abnormal value. Accordingly, when the abnormality occurs in measurement, the temperatures of the lighting device 1 and the light source 110 can be further suppressed from being increased.

The abnormality determiner 23 determines that, when the first measuring value is outside of the first temperature range, it is the abnormal value, and when the second measuring value is outside of the second temperature range, it is the abnormal value, as described above. In this case, the abnormality determiner 23 may be configured to change the first and second temperature ranges in accordance with the output of the power converter 10. That is, since heat generated by the lighting device 1 and the light source 110 is expected to be increased, as the value of the output of the power converter 10 is increased, the abnormality determiner 23 may be configured to change the first and second temperature ranges in accordance with the value of the output of the power converter 10. For example, the abnormality determiner 23 may shift the first and second temperature ranges to a higher temperature side with an increase in the value of the output of the power converter 10. Alternatively, the abnormality determiner 23 may change upper limits of the first and second temperature ranges without changing lower limits thereof so that those expand to a higher temperature side with an increase in the value of the output of the power converter 10. Accordingly, the abnormality determiner 23 can more certainly determine whether or not the first or second measuring value is the abnormal value.

The abnormality determiner 23 may be configured to determine whether or not the first and second measuring values are the abnormal value, while the light source unit 100 is not only in a lighting state but also in a non-lighting state (i.e., while the controller 20 receives no command for lighting the light source unit 100 from the ECU). That is, also in the non-lighting state of the light source unit 100, the abnormality determiner 23 determines that when the first measuring value is outside of the first temperature range, it is the abnormal value, and when the second measuring value is outside of the second temperature range, it is the abnormal value. When determining that the first or second measuring value is the abnormal value in the non-lighting state of the light source unit 100, the abnormality determiner 23 may cause the light source unit 100 to flash and/or output a report signal to the external device in order to externally report that the first or second measuring value is the abnormal value.

The first and second temperature ranges in the lighting state of the light source unit 100 may be respectively identical to those in the non-lighting state of the light source unit 100, or may be respectively different from those. It is expected that the first and second measuring values of the first and second temperature sensors 30 and 120 in the non-lighting state of the light source unit 100 are respectively less than those in the lighting state of the light source unit 100. Accordingly, the first and second temperature ranges in the non-lighting state may be respectively set to be less than those in the lighting state. In this case, the abnormality determiner 23 can more certainly determine whether or not the first or second measuring value is the abnormal value.

When the light source unit 100 is turned off, it is expected that the temperatures of the lighting device 1 and the light source 110 are reduced as a non-lighting period is increased. The abnormality determiner 23 may accordingly shift the first and second temperature ranges to a lower temperature side, as the non-lighting period of the light source unit 100 is increased. Alternatively, the abnormality determiner 23 may set the first and second temperature ranges to reduce the upper limits thereof without changing the lower limits thereof, as the non-lighting period of the light source unit 100 is increased. In this case, the abnormality determiner 23 can more certainly determine whether or not the first or second measuring value is the abnormal value.

The abnormality determiner 23 determines that, when the first measuring value is outside of the first temperature range, it is the abnormal value, and when the second measuring value is outside of the second temperature range, it is the abnormal value, however, the method for determining whether or not they are the abnormal value is not limited to this. The abnormality determiner 23 may determine that, when a difference between the first and second measuring values is equal to or more than a prescribed reference value for determination, the first or second measuring value is the abnormal value. When the abnormality determiner 23 determines that the first or second measuring value is the abnormal value, the output setter 24 may set the output of the power converter 10 to a smaller one of the setting values V1 and V2.

While the output of the power converter 10 is controlled to a rated output in the lighting state of the light source 110, it is expected that a difference between the temperatures of the lighting device 1 and the light source 110 falls within a fixed temperature range. For this reason, the difference between the temperatures of the lighting device 1 and the light source 110 may be previously measured, and a temperature (e.g., 50° C.) higher than the difference may be previously stored in the memory 26 of the controller 20, as the reference value for determination.

The abnormality determiner 23 calculates a temperature difference (an absolute value) between the first measuring value input to the first inputter 21 and the second measuring value input to the second inputter 22, and determines that the first or second measuring value is the abnormal value, when the temperature difference is equal to or more than the reference value for determination, obtained from the memory 26. It is expected that, when any one of the first and second measuring values is the abnormal value, the temperature difference (absolute value) between the first and second measuring values is equal to or more than the reference value for determination. Accordingly, the abnormality determiner 23 can determine whether or not the first or second measuring value is the abnormal value, based on the temperature difference between the first and second measuring values.

The abnormality determiner 23 may set the reference value for determination in the lighting state of the light source 110 and the reference value for determination in the non-lighting state of the light source 110 so that their values are different from each other. While the light source 110 is in the non-lighting state by the power conversion of the power converter 10 being stopped, it is expected that, as long as no heat source exists around the lighting device 1 or the light source 110, the temperature of the lighting device 1 is substantially identical to that of the light source 110. Accordingly, the reference value for determination in the lighting state of the light source 110 may be set to 50° C., but that in the non-lighting state may be set to 25° C., and they may be stored in the memory 26 of the controller 20. Since the abnormality determiner 23 in the non-lighting state of the light source 110 determines that, when the temperature difference between the first and second measuring values is equal to or more than 25° C., the first or second measuring value is the abnormal value, the abnormality determiner 23 can more certainly determine whether or not the first or second measuring value is the abnormal value.

The abnormality determiner 23 may be configured to determine that the first or second measuring value is the abnormal value, when a ratio of the second measuring value to the first measuring value is outside of a prescribed range.

Note that in the case where the determination of the abnormal value is executed based on the temperature difference (absolute value) between the first and second measuring values or the ratio of the second measuring value to the first measuring value, the abnormality determiner 23 cannot determine which of the first and second measuring values is the abnormal value. In this case, the abnormality determiner 23 may additionally determine whether or not each of the first and second measuring values is outside of a prescribed temperature range, in order to determine which of the first and second measuring values is the abnormal value.

Also when determining that the first or second measuring value is the abnormal value based on the temperature difference or the ratio, the abnormality determiner 23 may additionally determine which of the first and second measuring values is the abnormal value, based on: a first difference between the first measuring value in the lighting state and that in the non-lighting state; and a second difference between the second measuring value in the lighting state and that in the non-lighting state. For example, the abnormality determiner 23 may determine that a value corresponding to a smaller one of the first and second differences, of the first and second measuring values, is the abnormal value.

Also when determining that the first or second measuring value is the abnormal value based on the temperature difference or the ratio, the abnormality determiner 23 may additionally calculate: a first change difference between the first measuring value obtained before operation of increasing (or decreasing) the output of the power converter 10 and that obtained after the operation; and a second change difference between the second measuring value obtained before the operation and that obtained after the operation, and then determine that a value corresponding to a smaller one of the first and second change differences, of the first and second measuring values, is the abnormal value. When the output of the power converter 10 is increased (or decreased), the heat generated by the lighting device 1 and the light source 110 is also increased (or decreased), and it is accordingly expected that a value which is not the abnormal value, of the first and second measuring values, is increased (or decreased), but a value determined to be the abnormal value, thereof, is not changed. Therefore, when determining that the first or second measuring value is the abnormal value based on the temperature difference or the ratio, the abnormality determiner 23 may calculate the first and second change differences, and then determine that a value corresponding to a smaller one of the first and second change differences, of the first and second measuring values, is the abnormal value.

Second Embodiment

A lighting device 1 according to a Second Embodiment will be described with reference to FIG. 3.

The lighting device 1 of this embodiment is different from that of the First Embodiment in that, when one of first and second measuring values is determined to be an abnormal value, an output setter 24 is configured to set an output of a power converter 10 based on the other of the first and second measuring values, determined to be not the abnormal value. Hereinafter, components similar to those of the First Embodiment are denoted by same reference signs and explanations thereof are appropriately omitted. Configurations in the Second Embodiment (including variations) can be applied in appropriate combination with the above configurations described in the First Embodiment (including variations).

Figure 3A:
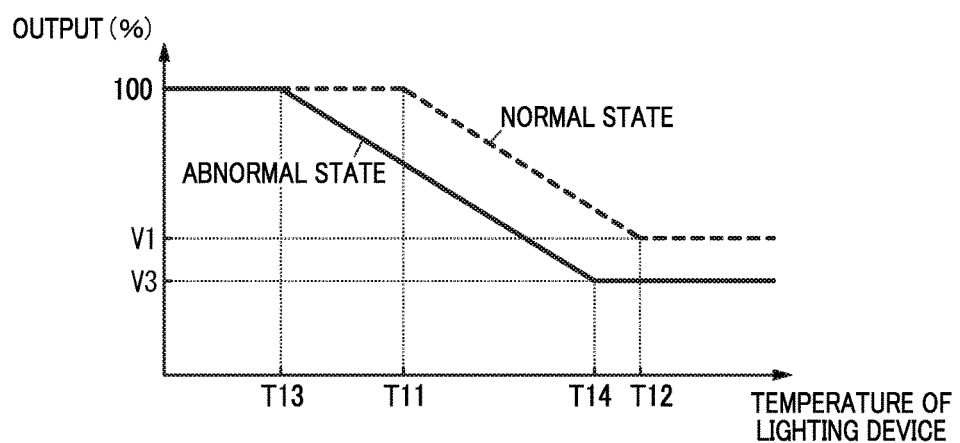
FIG. 3A is a graph illustrating a relation between a temperature and an output of a lighting device according to a Second Embodiment.
Figure 3B:
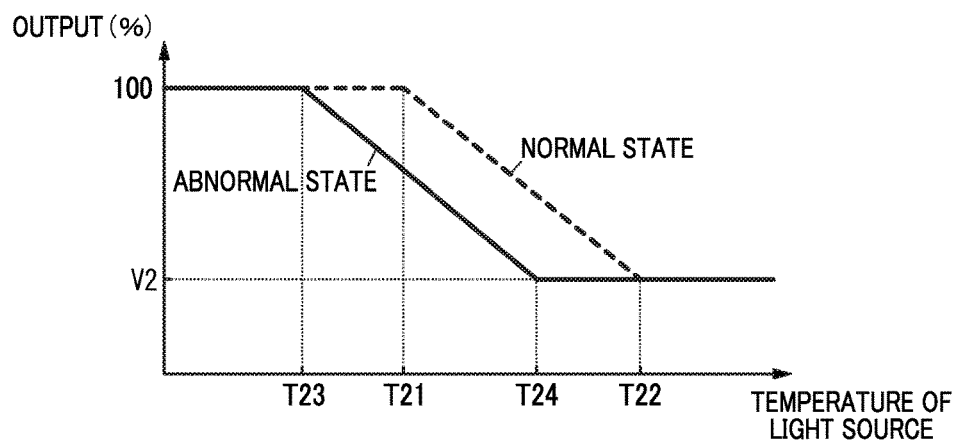
FIG. 3B is a graph illustrating a relation between a temperature and an output of a light source.

The lighting device 1 of this embodiment includes a controller 20 having a memory 26 that stores data of output characteristics, as shown in FIGS. 3A and 3B.

FIG. 3A shows a relation between a temperature of the lighting device 1 and the output of the power converter 10. In FIG. 3A, the output of the power converter 10 is represented as a percentage, when a rated output thereof to a light source 110 is defined as 100 [%]. In FIG. 3A, a normally output characteristic is illustrated by a dotted line. Since the normally output characteristic is similar to that illustrated in FIG. 2A, an explanation thereof is omitted. In FIG. 3A, an abnormally output characteristic is illustrated by a solid line. While the temperature of the lighting device 1 is equal to or less than a temperature T13, a setting value of the output of the power converter 10 is set to 100 [%]. While the temperature of the lighting device 1 is more than the temperature T13 and equal to or less than a temperature T14, the setting value of the output of the power converter 10 is set such that the output is monotonously decreased, depending on an increase in the temperature. When the temperature of the lighting device 1 exceeds the temperature T14, the setting value of the output of the power converter 10 is set to V3[%] (V3<V1). The temperature T13 is less than a temperature T11 (T13<T11), and the temperature T14 is more than the temperature T11, but less than a temperature T12 (T11<T14<T12). The abnormally output characteristic is preferably set so that even when an ambient temperature is increased, the temperatures of the lighting device 1 and the light source 110 fall into an allowable range.

FIG. 3B shows a relation between a temperature of the light source 110 and the output of the power converter 10. In FIG. 3B, the output of the power converter 10 is represented as a percentage, when a rated output thereof to the light source 110 is defined as 100 [%]. In FIG. 3B, a normally output characteristic is illustrated by a dotted line. Since the normally output characteristic is similar to that illustrated in FIG. 2B, an explanation thereof is omitted. In FIG. 3B, an abnormally output characteristic is illustrated by a solid line. While the temperature of the light source 110 is equal to or less than a temperature T23, a setting value of the output of the power converter 10 is set to 100 [%]. While the temperature of the light source 110 is more than the temperature T23 and equal to or less than a temperature T24, the setting value of the output of the power converter 10 is set such that the output is monotonously decreased, depending on an increase in the temperature. When the temperature of the light source 110 exceeds the temperature T24, the setting value of the output of the power converter 10 is set to V2 [%]. The temperature T23 is less than the temperature T21 (T23<T21), and the temperature T24 is more than the temperature T21, but less than the temperature T22 (T21<T24<T22). The abnormally output characteristic is preferably set so that even when the ambient temperature is increased, the temperatures of the lighting device 1 and the light source 110 fall into an allowable range.

Hereinafter, operation of the lighting device 1 of this embodiment, particularly operation of the output setter 24, will be described.

The output setter 24 sets the value of the output of the power converter 10 in accordance with a determination result of an abnormality determiner 23.

When the abnormality determiner 23 determines that both of the first and second measuring values are not the abnormal value, the output setter 24 calculates, based on the first measuring value, a first candidate value according to the normally output characteristic shown in FIG. 3A, obtained from the memory 26. Also, the output setter 24 calculates, based on the second measuring value, a second candidate value according to the normally output characteristic shown in FIG. 3B, obtained from the memory 26. The output setter 24 compares the first and second candidate values in magnitude, and uses a smaller one of the first and second candidate values, as the setting value of the output of the power converter 10.

On the other hand, when the abnormality determiner 23 determines that only the first measuring value is the abnormal value, the output setter 24 calculates, based on the second measuring value determined to be not the abnormal value, the setting value of the output of the power converter 10 according to the abnormally output characteristic shown in FIG. 3B, obtained from the memory 26.

When the abnormality determiner 23 determines that only the second measuring value is the abnormal value, the output setter 24 calculates, based on the first measuring value determined to be not the abnormal value, the setting value of the output of the power converter 10 according to the abnormally output characteristic shown in FIG. 3A, obtained from the memory 26.

An output controller 25 of the controller 20 controls a duty ratio (an on-duty) of a switching element(s) of the power converter 10 so that the output of the power converter 10 matches the setting value set by the output setter 24.

In this way, when the abnormality determiner 23 determines that one of the first and second measuring values is the abnormal value, the output setter 24 sets the value of the output of the power converter 10, based on the other of the first and second measuring values determined to be not the abnormal value and the abnormally output characteristic.

In this embodiment, the setting value of the output of the power converter 10 at high temperature in the abnormally output characteristic is set to be less than that at the high temperature in the normally output characteristic. Accordingly, when the output is set based on only a value of the first and second measuring values, determined to be not the abnormal value, it is possible to reduce a possibility that the temperatures of the lighting device 1 and the light source 110 become high. For example, when a measuring value of the temperature of the light source 110 (second measuring value) is determined to be the abnormal value, the output setter 24 sets the output of the power converter 10 based on a measuring value of the temperature of the lighting device 1 (first measuring value) and the abnormally output characteristic illustrated in FIG. 3A. As describe above, since the setting value of the output of the power converter 10 at high temperature (i.e., in a temperature range higher than the temperature T14) in the abnormally output characteristic is set to be less than that at the high temperature in the normally output characteristic, it is possible to reduce a possibility that the temperatures of the lighting device 1 and the light source 110 become high.

Furthermore, even when the first or second measuring value is determined to be the abnormal value, the lighting device 1 can cause the light source 110 to emit light, and it is therefore possible to illuminate a desired area.

Third Embodiment

Figure 4:
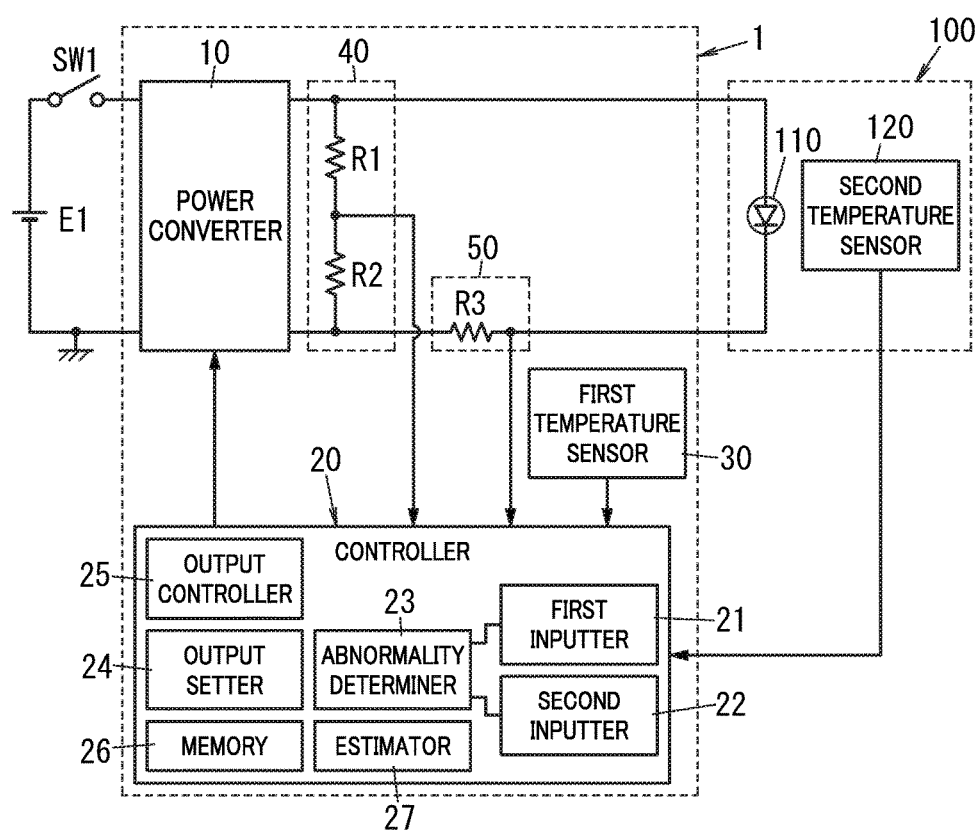
FIG. 4 is a circuit diagram of a lighting device according to a Third Embodiment.

A lighting device 1 according to a Third Embodiment will be described with reference to FIGS. 4 and 5.

The lighting device 1 of this embodiment is different from that of the First Embodiment in that a controller 20 further includes an estimator 27. Hereinafter, components similar to those of the First Embodiment are denoted by same reference signs and explanations thereof are appropriately omitted. Configurations in the Third Embodiment (including variations) can be applied in appropriately combination with the above configurations described in the First and Second Embodiments (including variations).

In the lighting device 1 of this embodiment, the controller 20 has a memory 26 that stores data of a correlation value. The correlation value represents a correlation between a first measuring value and a second measuring value, obtained in a state where both of the first and second measuring values are not an abnormal value. That is, the controller 20 calculates the correlation value representing the correlation between the first and second measuring values in the state where both of the first and second measuring values are not the abnormal value, and stores the correlation value in the memory 26. The controller 20 stores, for example, a difference between the first and second measuring values, as the correlation value, in the memory 26.

Figure 5A:
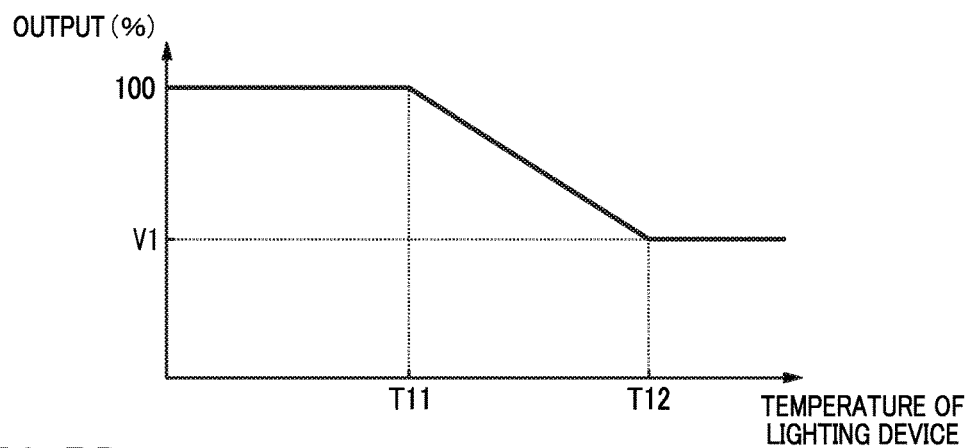
FIG. 5A is a graph illustrating a relation between a temperature and an output of the lighting device.
Figure 5B:
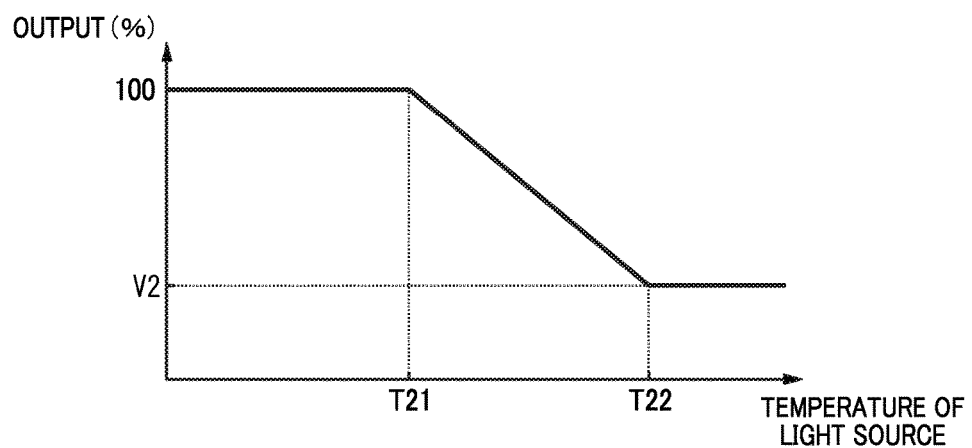
FIG. 5B is a graph illustrating a relation between a temperature and an output of a light source.

In addition, the memory 26 of the controller 20 stores data of output characteristics, as shown in FIGS. 5A and 5B. FIG. 5A shows a relation between a temperature of the lighting device 1 and an output of a power converter 10. In FIG. 5A, the output of the power converter 10 is represented as a percentage, when a rated output thereof to a light source 110 is defined as 100 [%]. Since the output characteristic of FIG. 5A is similar to the normally output characteristic illustrated in FIG. 2A, an explanation thereof is omitted. FIG. 5B shows a relation between a temperature of the light source 110 and the output of the power converter 10. In FIG. 5B, the output of the power converter 10 is represented as a percentage, when a rated output thereof to the light source 110 is defined as 100 [%]. Since the output characteristic of FIG. 5B is similar to the normally output characteristic illustrated in FIG. 2B, an explanation thereof is omitted.

When an abnormality determiner 23 of the controller 20 determines that one of the first and second measuring values is the abnormal value, the estimator 27 estimates the one of the first and second measuring values, based on the correlation value in the memory 26 and the other of the first and second measuring values.

Hereinafter, operation of a characterized part in the lighting device 1 of this embodiment will be described.

In the state where both of the first and second measuring values are not the abnormal value, the controller 20 calculates the correlation value representing the correlation between the first and second measuring values, and stores the correlation value in the memory 26. In this case, the controller 20 calculates the correlation value, for example, at a timing when a prescribed time elapses after start of lighting operation and the first and second measuring values fall in a suitable state. In this embodiment, as one example, it is assumed that the controller 20 stores, in the memory 26, the correlation value where the second measuring value is higher than the first measuring value by 20° C.

Since operation of the controller 20 for controlling the output of the power converter 10 when both of the first and second measuring values are not the abnormal value is similar to that in the First Embodiment, an explanation thereof is omitted. Accordingly, operation of the controller 20 when the first or second measuring value is determined to be the abnormal value is described below.

When the abnormality determiner 23 determines that the first measuring value input to the first inputter 21 is the abnormal value, the estimator 27 subtracts 20° C. from the second measuring value, using the second measuring value determined to be not the abnormal value and the correlation value obtained from the memory 26, and estimates that an obtained value corresponds to the first measuring value.

Then, an output setter 24 calculates, based on an estimation value of the first measuring value estimated by the estimator 27, a first candidate value of the output of the power converter 10 according to the output characteristic shown in FIG. 5A. Also, the output setter 24 calculates, based on the second measuring value input to the second inputter 22, a second candidate value of the output of the power converter 10 according to the output characteristic shown in FIG. 5B. The output setter 24 then compares the first and second candidate values in magnitude, and uses a smaller one of the first and second candidate values, as the setting value of the output of the power converter 10. An output controller 25 of the controller 20 then controls a duty ratio (an on-duty) of a switching element(s) of the power converter 10 so that the output of the power converter 10 matches the setting value set by the output setter 24.

When the abnormality determiner 23 determines that the second measuring value input to the second inputter 22 is the abnormal value, the estimator 27 estimates the second measuring value, using the first measuring value determined to be not the abnormal value and the correlation value obtained from the memory 26. Since a processing for estimating the second measuring value is similar to the above-mentioned processing for estimating the first measuring value, an explanation thereof is omitted.

In this way, when the abnormality determiner 23 determines that one of the first and second measuring values is the abnormal value, the estimator 27 estimates the one of the first and second measuring values, based on the correlation value in the memory 26 and the other of the first and second measuring values. The output setter 24 then calculates the setting value of the output of the power converter 10 based on the estimation value of the one of the first and second measuring values and the other of the first and second measuring values. The output controller 25 then controls the duty ratio of the switching element(s) of the power converter 10 so that the output of the power converter 10 matches the setting value set by the output setter 24.

Note that the controller 20 may store, in the memory 26, a value obtained by applying a statistic processing to the difference between the first and second measuring values (such as an average, a median, a maximum or a minimum, of the difference during a fixed time period), a ratio between the first and second measuring values, or the like, as the correlation value.

Incidentally, it is expected that the correlation between the first measuring value which is the temperature of the lighting device 1 and the second measuring value which is the temperature of the light source 110 is changed, also depending on input and output values of the lighting device 1. Examples of the "input and output values" of the lighting device 1 mentioned herein include values of an input current, an input voltage, input power, an output current, an output voltage, output power, and the like of the lighting device 1. The controller 20 may therefore calculate the correlation value representing the correlation between the first and second measuring values, using, as parameters, one or more of the input current, the input voltage, the input power, the output current, the output voltage and the output power of the lighting device 1, and store it in the memory 26. Thus, the estimator 27 can cancel a change in the correlation value caused by the input and output values of the lighting device 1, thereby more precisely estimating the measuring value determined to be the abnormal value.

Fourth Embodiment

Figure 6:
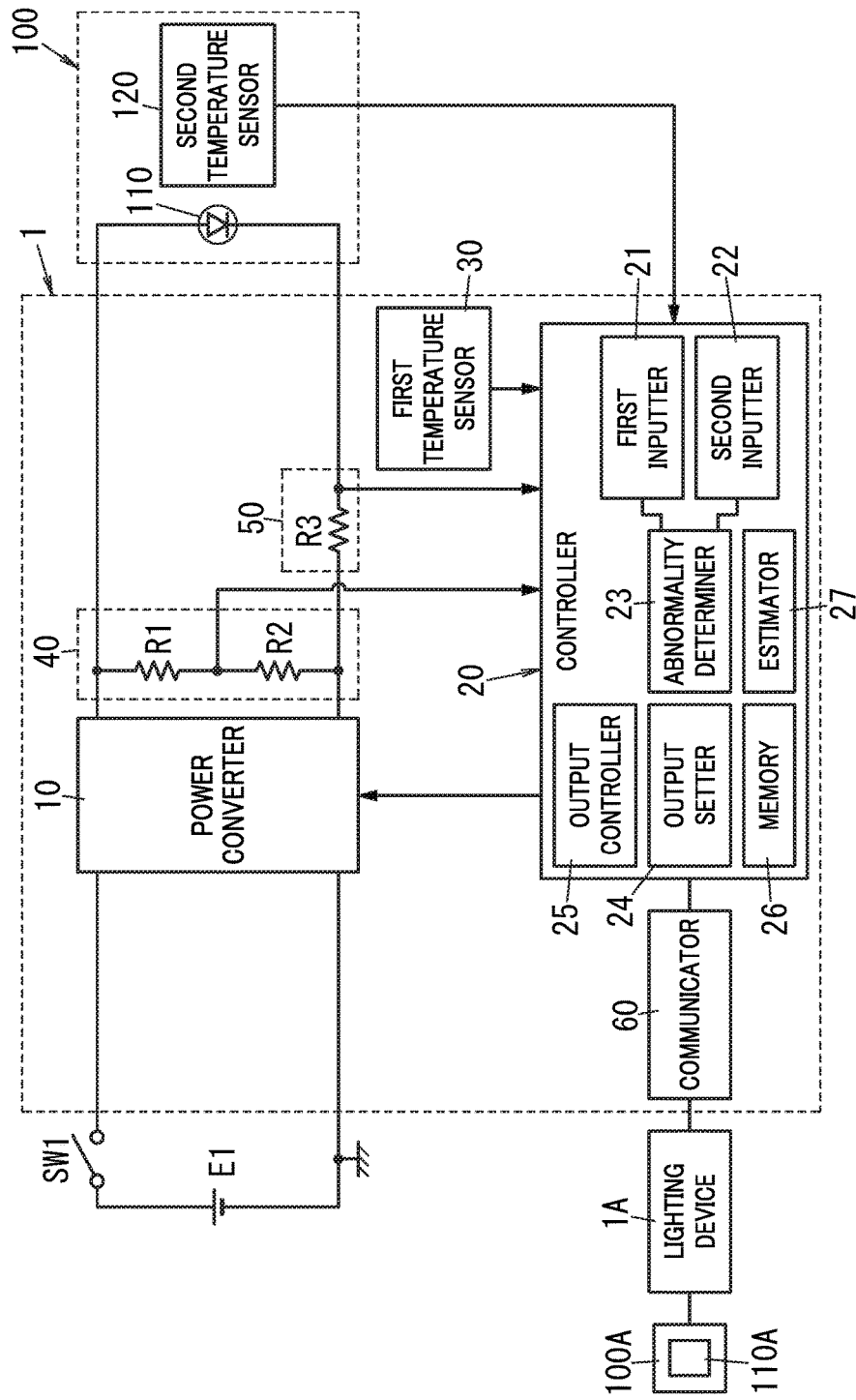
FIG. 6 is a circuit diagram of a lighting device according to a Fourth Embodiment.

A lighting device 1 according to a Fourth Embodiment will be described with reference to FIG. 6.

The lighting device 1 of this embodiment is different from that of the Third Embodiment in that the lighting device 1 further includes a communicator 60. Hereinafter, components similar to those of the Third Embodiment are denoted by same reference signs and explanations thereof are appropriately omitted. Configurations in the Fourth Embodiment (including variations) can be applied in appropriate combination with the above configurations described in the First to Third Embodiments (including variations).

The communicator 60 is configured to communicate with another lighting device 1A that has the same specification as the lighting device 1. The lighting device 1 of this embodiment is applied for lighting a light source unit 100 to be used as a headlamp of a vehicle such as an automobile. For example, two headlamps are respectively attached to a front right side and a front left side of a vehicle body of the vehicle such as an automobile, and the lighting device 1 and the lighting device 1A with the same specification as the lighting device 1 are also installed to the front right side and the front left side of the vehicle body. The communicator 60 communicates with the lighting device 1A having the same configuration installed to the same vehicle, using a communication network provided in the vehicle. The communicator 60 may be a communication module complying with a communication protocol, such as a Local Interconnect Network (LIN) or a Controller Area Network (CAN) to be utilized in an in-vehicle network.

That is, the lighting devices 1 and 1A of this embodiment have the same configurations, and constitute a lighting system. In other words, the lighting system is constituted by the two lighting devices 1 and 1A with the same configurations and the two respective lighting devices constituting the lighting system corresponds to lighting devices 1 of this embodiment. The number of the lighting devices constituting the lighting system is two in this embodiment, but the lighting system may be constituted by three or more lighting devices with the same configurations.

The matter that "the lighting device 1A has the same specification as the lighting device 1" mentioned herein means that the configuration relating to heat generation or heat radiation, of the lighting device 1A, is the same as that of the lighting device 1, and, for example, the lighting device 1A includes a power converter 10 and a controller 20 having the same configurations as those of the lighting device 1. The light source 110 to be lit by the lighting device 1 has the same specification as a light source 110A to be lit by the lighting device 1A. The numbers of light-emitting diodes, input currents, input voltages and the like of the light sources 110 and 110A are the same as each other. Since the lighting device 1A has the same specification as the lighting device 1, it is expected that temperatures inside a main body 70A of the lighting device 1A and of the light source 110A are respectively substantially identical to temperatures inside a main body 70 of the lighting device 1 and of the light source 110, if there is no influence of facility environment or the like.

Since operation of the controller 20 when an abnormality determiner 23 determines that both of first and second measuring values are not an abnormal value is similar to that in the First Embodiment, an explanation thereof is omitted.

When the abnormality determiner 23 determines that one of the first and second measuring values is the abnormal value, the controller 20 causes the communicator 60 to transmit, to the lighting device 1A, a request signal for requesting transmission of a measuring value of a temperature of the lighting device 1A and a measuring value of a temperature of the light source 110A to be lit by the lighting device 1A. Hereinafter, the measuring value of the temperature of the lighting device 1A is referred to as a third measuring value, and the measuring value of the temperature of the light source 110A in a light source unit 100A to be lit by the lighting device 1A is referred to as a fourth measuring value. The controller 20 may additionally cause the communicator 60 to transmit, to the lighting device 1A, an abnormality information signal for reporting that abnormality occurs in measurement.

After transmission of the request signal, when the communicator 60 receives the third and fourth measuring values from the lighting device 1A, an output setter 24 of the controller 20 calculates a setting value of an output of the power converter 10, using the third and fourth measuring values received from the lighting device 1A. That is, the output setter 24 calculates the setting value of the output, based on: one determined to be a normal value, of the first and second measuring values; and the measuring value of the lighting device 1A. Note that a memory 26 of the controller 20 stores data of output characteristics shown in FIGS. 5A and 5B, similarly to the Third Embodiment.

For example, when the first measuring value which is the temperature of the lighting device 1 is determined to be the abnormal value, the output setter 24 of the controller 20 calculates the setting value of the output of the power converter 10, based on: the second measuring value; and the third measuring value of the temperature of the lighting device 1A, received from the lighting device 1A. More specifically, the output setter 24 calculates, based on the third measuring value of the lighting device 1A, a first candidate value of the output of the power converter 10 according to the output characteristic shown in FIG. 5A, obtained from the memory 26. Also, the output setter 24 calculates, based on the second measuring value determined to be not the abnormal value, a second candidate value of the output of the power converter 10 according to the output characteristic shown in FIG. 5B, obtained from the memory 26. The output setter 24 compares the first and second candidate values in magnitude, and sets a smaller one of the first and second candidate values to the setting value of the output of the power converter 10.

When the second measuring value which is the temperature of the light source 110 is determined to be the abnormal value, the output setter 24 of the controller 20 calculates the setting value of the output of the power converter 10, based on: the first measuring value; and the fourth measuring value of the temperature of the light source 110A, received from the lighting device 1A. More specifically, the output setter 24 calculates, based on the first measuring value determined to be not the abnormal value, a first candidate value of the output of the power converter 10 according to the output characteristic shown in FIG. 5A, obtained from the memory 26. Also, the output setter 24 calculates, based on the fourth measuring value of the lighting device 1A, a second candidate value of the output of the power converter 10 according to the output characteristic shown in FIG. 5B, obtained from the memory 26. The output setter 24 compares the first and second candidate values in magnitude, and sets a smaller one of the first and second candidate values to the setting value of the output of the power converter 10.

When the output setter 24 sets the output of the power converter 10 in the above manner, an output controller 25 of the controller 20 controls a duty ratio (an on-duty) of a switching element(s) of the power converter 10 so that the output of the power converter 10 matches the setting value set by the output setter 24.

Furthermore, in the lighting device 1 of this embodiment, when the communicator 60 receives the request signal from the lighting device 1A, the controller 20 of the lighting device 1 causes the communicator 60 to transmit the first and second measuring values to the lighting device 1A (external device). Accordingly, even when the third or fourth measuring value is determined to be the abnormal value in the lighting device 1A, the lighting device 1A can calculate the setting value of the output of the power converter 10, using the first and second measuring values measured by the lighting device 1.

A timing when each of the lighting devices 1 and 1A transmits the measuring values of the temperatures thereof and of the light source is not limited to a timing after receiving the request signal.

The lighting devices 1 and 1A may mutually transmit/receive the temperatures thereof (the first and third measuring values) and the temperatures of the light sources 110 and 110A (the second and fourth measuring values).

Alternatively, each of the lighting devices 1 and 1A may transmit, when at least one of the measuring values of the temperatures thereof and of the light source is increased to a value equal to or more than a prescribed threshold on a high temperature side, the measuring values to the other. Alternatively, each of the lighting devices 1 and 1A may transmit, when at least one of the measuring values of the temperatures thereof and of the light source is reduced to a value equal to or less than a prescribed threshold on a low temperature side, the measuring values to the other.

In the lighting device 1 of this embodiment, when at least one of the first and second measuring values is determined to be the abnormal value, an estimator 27 of the controller 20 may estimate the measuring value determined to be the abnormal value, using the third or fourth measuring value of the lighting device 1A.

In the case where the estimator 27 estimates the measuring value, the lighting devices 1 and 1A mutually transmit/receive the temperatures thereof (the first and third measuring values) and the temperatures of the light sources 110 and 110A (the second and fourth measuring values).

In a state where both of the first and second measuring values are not the abnormal value, the controller 20 calculates: a first correlation value representing a correlation between the first and third measuring values; and a second correlation value representing a correlation between the second and fourth measuring values. The controller 20 stores the first and second correlation values in the memory 26. For example, the controller 20 stores, in the memory 26, a difference between the first and third measuring values as the first correlation value, and further a difference between the second and fourth measuring values as the second correlation value.

When the abnormality determiner 23 determines that one of the first and second measuring values is the abnormal value, the estimator 27 estimates the one of the first and second measuring values based on the third or fourth measuring value of the lighting device 1A and the first or second correlation value obtained from the memory 26.

Hereinafter, operation of a characterized part in the lighting device 1 of this embodiment will be described.

In the state where both of the first and second measuring values are not the abnormal value, the controller 20 calculates the first and second correlation values, and then stores those in the memory 26. The controller 20 calculates the first and second correlation values, for example, at a timing when a prescribed time elapses after start of lighting operation and the first and second measuring values fall in a suitable state. In this embodiment, it is assumed that the controller 20 stores, in the memory 26, the first correlation value where the third measuring value is higher than the first measuring value by 7° C. and the second correlation value where the fourth measuring value is higher than the second measuring value by 10° C. Those values of the first and second correlation values are merely examples, and they may be appropriately modified, depending on usage environment or the like.

Since operation of the controller 20 for controlling the output of the power converter 10 when both of the first and second measuring values are not the abnormal value is similar to that in the First Embodiment, an explanation thereof is omitted. Accordingly, operation of the controller 20 when the first or second measuring value is determined to be the abnormal value is described below.

When the abnormality determiner 23 determines that the first measuring value input to the first inputter 21 is the abnormal value, the estimator 27 estimates the first measuring value determined to be the abnormal value, using the third or fourth measuring value of the lighting device 1A.

For example, when the abnormality determiner 23 determines that the first measuring value which is the temperature of the lighting device 1 is the abnormal value, the estimator 27 estimates the first measuring value based on the third measuring value which is the temperature of the lighting device 1A, received from the lighting device 1A, and the first correlation value obtained from the memory 26. The estimator 27 subtracts 7° C. from the third measuring value and estimates that an obtained value corresponds to the first measuring value. The output setter 24 calculates the setting value of the output of the power converter 10 based on a result estimated as the first measuring value and the second measuring value determined to be not the abnormal value. Note that since operation of the output setter 24 for calculating the setting value the output of the power converter 10 is similar to that in the Third Embodiment, an explanation thereof is omitted.

When the abnormality determiner 23 determines that the second measuring value which is the temperature of the light source 110 is the abnormal value, the estimator 27 estimates the second measuring value based on the fourth measuring value which is the temperature of the light source 110A, received from the lighting device 1A, and the second correlation value obtained from the memory 26. The estimator 27 subtracts 10° C. from the fourth measuring value and estimates that an obtained value corresponds to the second measuring value. The output setter 24 calculates the setting value of the output of the power converter 10 based on the first measuring value determined to be not the abnormal value and a result estimated as the second measuring value.

When the abnormality determiner 23 determines that both of the first and second measuring values are the abnormal value, the estimator 27 may estimate the first measuring value based on the third measuring value of the lighting device 1A and the first correlation value, and estimate the second measuring value based on the fourth measuring value of the lighting device 1A and the second correlation value.

Incidentally, even when the lighting devices 1 and 1A have the same configurations, the temperatures of the lighting devices 1 and 1A or the temperatures of the light sources 110 and 110A may be different from each other, depending on a difference in distances from another heat source to the lighting devices 1 and 1A or a difference in heat radiation characteristics of the lighting devices 1 and 1A and the light sources 110 and 110A.

Even in this case, since the estimator 27 estimates a measuring value, determined to be the abnormal value, based on a measuring value of the lighting device 1A (the third or fourth measuring value) and a correlation value (the first or second correlation value), it is possible to more precisely estimate the measuring value determined to be the abnormal value.

Furthermore, in the lighting device 1 of this embodiment, the controller 20 may cause the communicator 60 to transmit a report signal for reporting occurrence of abnormality to an external device, such as an ECU of a vehicle, when the abnormality determiner 23 determines that the first or second measuring value is the abnormal value. When receiving the report signal from the lighting device 1, the ECU of the vehicle causes, for example, a meter panel provided at front of a driver's seat to display that the abnormality occurs in the function sensing temperature, thereby prompting a user of the vehicle to take a measure such as inspection or repair.

When the abnormality determiner 23 determines that the first or second measuring value is the abnormal value, even if receiving a lighting command from the external device, the controller 20 may perform control for slightly delaying start of lighting the light source unit 100 to externally report that the first or second measuring value is determined to be the abnormal value, rather than control for lighting the light source unit 100 immediately after reception of the lighting command. In this case, the controller 20 changing the output of the power converter 10 also serves as a reporter that is to externally report that the first or second measuring value is determined to be the abnormal value.

In case the lighting device 1 causes the light source unit 100, which is a light source to be applied for a vehicle, to emit light, the controller 20 may perform the following control so as to externally report that abnormality occurs in measurement.

For example, when the vehicle is stopped (for example, when a parking brake system is operated) in the state where the abnormality determiner 23 determines that the abnormality occurs in measurement, the controller 20 may cause the light source 110 to flash in order to externally report the occurrence of the abnormality in measurement.

Alternatively, in order to externally report the occurrence, the controller 20 may change the output of the power converter 10, depending on during stopping or travelling of the vehicle. For example, the controller 20 during travelling of the vehicle may set the setting value set by the output setter 24 as the output of the power converter 10, but during stopping of the vehicle may increase the output of the power converter 10 so as to be higher than the output thereof during travelling of the vehicle in order to externally report the occurrence.

Fifth Embodiment

Figure 7:
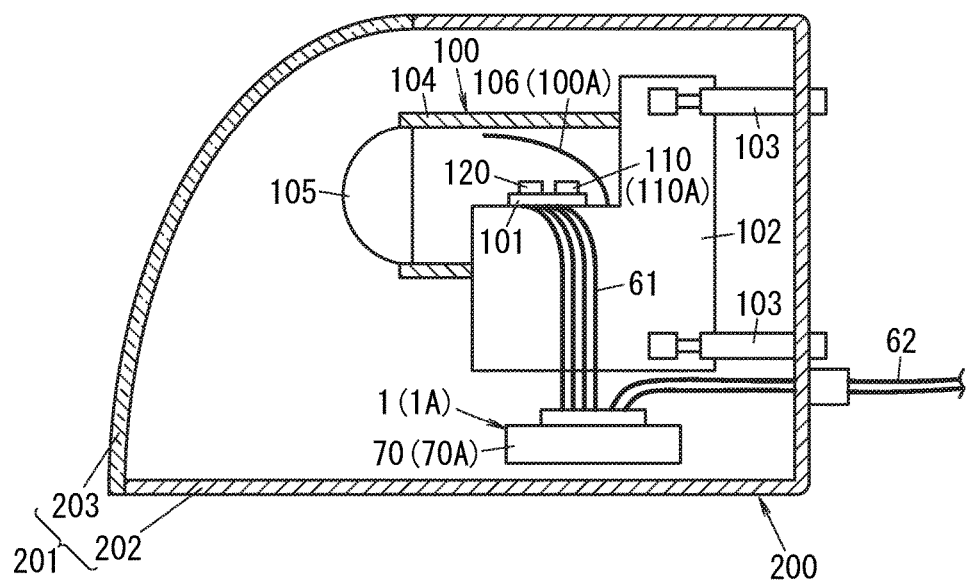
FIG. 7 is a cross-sectional view of a luminaire according to a Fifth Embodiment.

FIG. 7 shows a cross-sectional view of a luminaire 200 according to this embodiment.

The luminaire 200 according to this embodiment is, for example, a vehicle headlight device.

The luminaire 200 includes a luminaire body 201 for housing the lighting device 1 and the light source unit 100, described in the First Embodiment.

The luminaire body 201 is constituted by a body 202 and a cover 203.

The body 202 is made of synthetic resin or metal so as to have a box-shape, which of front face has an opening.

The cover 203 is made of material, such as glass or acrylic resin, which allows light to pass through, and is to be attached to the opening of the body 202.

The light source unit 100 includes a substrate 101 on which the light source 110 is mounted. On the substrate 101, the second temperature sensor 120 as a thermistor is also mounted.

The substrate 101 is attached to a heat radiation member 102. The heat radiation member 102 is secured to the body 202 with a support member 103, such as a screw.

The light source unit 100 further includes a lens 105 for controlling light distribution. The lens 105 is attached to the heat radiation member 102 with a support member 104. To the heat radiation member 102, a reflection member 106 is attached. The reflection member 106 reflects light emitted by the light source 110 so as to cause reflected light to enter the lens 105.

Also the body 202 houses therein the lighting device 1. The main body 70 of the lighting device 1 is disposed on a lower side of the light source unit 100 inside the body 202, and attached to the body 202 with a support member. The lighting device 1 and the substrate 101 of the light source unit 100 are electrically connected to each other with electric wires 61. The lighting device 1 is further connected to the DC power supply E1 with electric wires 62.

The luminaire 200 is not limited to a configuration with the lighting device 1 and the light source unit 100 described in the First Embodiment, but may include the lighting device 1 described in any one of the First to Fourth Embodiments (including variations) and the light source unit 100.

Since the luminaire 200 of this embodiment includes the lighting device 1 described in any one of the First to Fourth Embodiments, it is possible to provide the luminaire 200 including the lighting device 1 which can reduce occurrence of an abnormal control state, even when abnormality occurs in a function of sensing temperature.

Note that the luminaire 200 is not limited to the vehicle headlight device, but may be a facility luminaire to be applied for a facility, such as a home, an office building or a commercial facility, or a luminaire such as a downlight.

Sixth Embodiment

Figure 8:
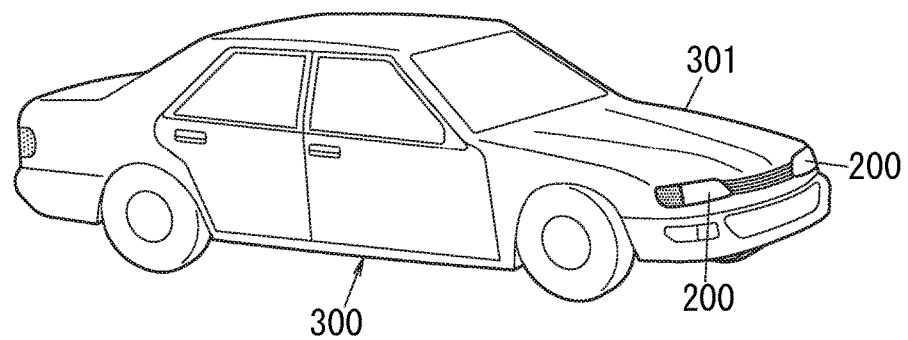
FIG. 8 is a perspective view of a vehicle according to a Sixth Embodiment.

FIG. 8 is a perspective view of a vehicle 300 according to this embodiment.

The vehicle 300 is, for example, a sedan type of general automobile.

The luminaire 200 described in the Fifth Embodiment is disposed on each of a front right side and a front left side of a vehicle body 301 of the vehicle 300. Since the luminaire 200 includes the lighting device 1 described in any one of the First to Fourth Embodiments, it is possible to provide the vehicle 300 including the lighting device 1 which can reduce occurrence of an abnormal control state, even when abnormality occurs in a function of sensing temperature.

CONCLUSION

As apparent from the above-mentioned embodiments, a lighting device (1) of a first aspect includes a power converter (10) configured to convert input power to be output to a light source (110); a controller (20) configured to control an output of the power converter (10); and a main body (70) for housing therein at least the power converter (10) and the controller (20). The controller (20) includes a first inputter (21) and a second inputter (22). The first inputter (21) is configured to receive a first measuring value from a first temperature sensor (30) for sensing a temperature inside the main body (70). The second inputter (22) is configured to receive a second measuring value from a second temperature sensor (120) for sensing a temperature of the light source (110). The controller (20) is configured to control the output of the power converter (10) so as to suppress a value of the output, when determining that both of the first measuring value and the second measuring value are not an abnormal value, and further when any one of the first measuring value and the second measuring value exceeds a prescribed threshold. The controller (20) is configured to control the output of the power converter (10) to another value that is different from the value of the output based on the first measuring value and the second measuring value, when determining that at least one of the first measuring value and the second measuring value is the abnormal value.

According to the lighting device (1) of the first aspect, when determining that at least one of the first and second measuring values is the abnormal value, the controller (20) controls the output of the power converter (10) to another value that is different from the value of the output based on the first and second measuring values. Accordingly, the output of the power converter (10) is not controlled to the value of the output determined based on the measuring value(s), determined to be the abnormal value, and it is therefore possible to reduce occurrence of an abnormal control state, even when abnormality occurs in a function of sensing temperature.

Regarding a lighting device (1) of a second aspect, in the first aspect, the controller (20) is configured to control the output of the power converter (10) to a fixed value, when determining that at least one of the first measuring value and the second measuring value is the abnormal value.

According to the lighting device (1) of the second aspect, when abnormality occurs in the function of sensing temperature, the controller (20) controls the output of the power converter (10) to a fixed value. It is therefore possible to reduce occurrence of the abnormal control state, even when abnormality occurs in the function of sensing temperature.

Regarding a lighting device (1) of a third aspect, in the second aspect, the fixed value is less than the value of the output when both of the first measuring value and the second measuring value are not the abnormal value.

According to the lighting device (1) of the third aspect, when abnormality occurs in the function of sensing temperature, the output of the power converter (10) is reduced. It is therefore possible to suppress increase in temperatures of the lighting device (1) and the light source (110).

Regarding a lighting device (1) of a fourth aspect, in the first aspect, when determining that one of the first measuring value and the second measuring value is the abnormal value, the controller (20) is configured to calculate an estimation value of one temperature of the temperature inside the main body (70) of the lighting device (1) and the temperature of the light source (110), which corresponds to the one of the first measuring value and the second measuring value determined to be the abnormal value. The controller (20) calculates the estimation value, based on the other of the first measuring value and the second measuring value. The controller (20) is configured to control the value of the output of the power converter (10) based on: the estimation value of the one temperature, which corresponds to the one of the first measuring value and the second measuring value determined to be the abnormal value; and the other of the first measuring value and the second measuring value.

According to the lighting device (1) of the fourth aspect, when determining that one of the first and second measuring values is the abnormal value, the controller (20) controls the value of the output of the power converter (10) based on: a result estimated as the one of the first and second measuring values determined to be the abnormal value; and the other of the first and second measuring values. It is therefore possible to reduce occurrence of the abnormal control state, even when abnormality occurs in the function of sensing temperature.

A lighting device (1) of a fifth aspect, in the fourth aspect, further includes a memory (26). The memory (26) stores a correlation value representing a correlation between the first measuring value and the second measuring value, obtained in a state where both of the first measuring value and the second measuring value are not the abnormal value. The controller (20) is configured to calculate the estimation value of the one temperature based on the correlation value in the memory (26) and the other of the first measuring value and the second measuring value.

According to the lighting device (1) of the fifth aspect, since the controller (20) estimates, based on the estimation value, a measuring value determined to be the abnormal value, of the first and second measuring values, it is possible to more precisely estimate the measuring value, determined to be the abnormal value. It is therefore possible to reduce occurrence of the abnormal control state, even when abnormality occurs in the function of sensing temperature.

A lighting device (1) of a sixth aspect, in the first aspect, further includes a communicator (60). The communicator (60) is configured to receive a third measuring value and a fourth measuring value from another lighting device (1A). The third measuring value is obtained by measuring a temperature inside another main body (70A) of the other lighting device (1A). The fourth measuring value is obtained by measuring a temperature of another light source (110A) to be lit by the other lighting device (1A). When determining that one of the first measuring value and the second measuring value is the abnormal value, the controller (20) is configured to control the value of the output of the power converter (10) based on: one of the third measuring value and the fourth measuring value received by the communicator (60), which corresponds to the one of the first measuring value and the second measuring value determined to be the abnormal value; and the other of the first measuring value and the second measuring value.

According to the lighting device (1) of the sixth aspect, when determining that one of the first and second measuring values is the abnormal value, the controller (20) controls the value of the output of the power converter (10) based on the other of the first and second measuring values and the measuring value input to the communicator (60) from another lighting device (1A). Thus, even when abnormality occurs in the function of sensing temperature, the output of the power converter (10) is not controlled based on the measuring value, determined to be the abnormal value, and it is therefore possible to reduce occurrence of the abnormal control state.

A lighting device (1) of a seventh aspect, in the first aspect, further includes a communicator (60) and a memory (26). The communicator (60) is configured to receive a third measuring value and a fourth measuring value from another lighting device (1A). The third measuring value is obtained by measuring a temperature inside another main body (70A) of the other lighting device (1A). The fourth measuring value is obtained by measuring a temperature of another light source (110A) to be lit by the other lighting device (1A). The memory (26) stores a correlation value (first correlation value) representing a correlation between the first measuring value and the third measuring value, obtained in a state where the first measuring value is not the abnormal value. When determining that the first measuring value is the abnormal value, the controller (20) is configured to calculate an estimation value of the temperature inside the main body (70) of the lighting device (1), using the third measuring value received by the communicator (60) and the correlation value representing the correlation between the first measuring value and the third measuring value in the memory (26). The controller (20) is configured to control the value of the output of the power converter (10) based on the second measuring value and the estimation value of the temperature inside the main body (70) of the lighting device (1).

According to the lighting device (1) of the seventh aspect, even when the first measuring value is determined to be the abnormal value, the controller (20) can estimate the first measuring value, using the third measuring value of another lighting device (1A) and the correlation value. Accordingly, the controller (20) controls the output of the power converter (10) based on a result estimated as the first measuring value and the second measuring value, thereby reducing occurrence of the abnormal control state, even when abnormality occurs in the function of sensing temperature.

A lighting device (1) of an eighth aspect, in the first aspect or the seventh aspect, further includes a communicator (60) and a memory (26). The communicator (60) is configured to receive a third measuring value and a fourth measuring value from another lighting device (1A). The third measuring value is obtained by measuring a temperature inside another main body (70A) of the other lighting device (1A). The fourth measuring value is obtained by measuring a temperature of another light source (110A) to be lit by the other lighting device (1A). The memory (26) stores a correlation value (second correlation value) representing a correlation between the second measuring value and the fourth measuring value, obtained in a state where the second measuring value is not the abnormal value. When determining that the second measuring value is the abnormal value, the controller (20) is configured to calculate an estimation value of the temperature of the light source (110), using the fourth measuring value received by the communicator (60) and the correlation value representing the correlation between the second measuring value and the fourth measuring value in the memory (26). The controller (20) is configured to control the value of the output of the power converter (10) based on the first measuring value and the estimation value of the temperature of the light source (110).

According to the lighting device (1) of the eighth aspect, even when the second measuring value is determined to be the abnormal value, the controller (20) can estimate the second measuring value, using the fourth measuring value of another lighting device (1A) and the correlation value. Accordingly, the controller (20) controls the output of the power converter (10) based on the first measuring value and a result estimated as the second measuring value, thereby reducing occurrence of the abnormal control state, even when abnormality occurs in the function of sensing temperature.

A lighting device (1) of a ninth aspect, in the first aspect, further includes a communicator (60) configured to output the first measuring value and the second measuring value to an external device (e.g., another lighting device (1A)).

According to the lighting device (1) of the ninth aspect, the external device can use the first and second measuring values, output from the lighting device (1). In addition, when the external device is another lighting device (1A), the lighting device (1A) can perform a processing for estimating the measuring value or the like, using the first and second measuring values output from the lighting device (1).

Regarding a lighting device (1) of a tenth aspect, in any one of the first to the ninth aspects, the controller (20) is configured to determine that any one of the first measuring value and the second measuring value is the abnormal value, when being outside of a prescribed temperature range.

According to the lighting device (1) of the tenth aspect, when the first or second measuring value is outside of the prescribed temperature range, the controller (20) can determine that the first or second measuring value is the abnormal value.

Regarding a lighting device (1) of an eleventh aspect, in any one of the first to the tenth aspects, the controller (20) is configured to determine that the first measuring value or the second measuring value is the abnormal value, when a difference between the first measuring value and the second measuring value is equal to or more than a prescribed reference value for determination.

According to the lighting device (1) of the eleventh aspect, when the difference between the first and second measuring values is equal to or more than the prescribed reference value for determination, the controller (20) can determine that any one of the first and second measuring values is the abnormal value.

Regarding a lighting device (1) of a twelfth aspect, in any one of the first to the eleventh aspects, further includes a reporter (20, 100) configured to externally report that the first measuring value or the second measuring value is determined to be the abnormal value, when the controller (20) determines that at least one of the first measuring value and the second measuring value is the abnormal value.

According to the lighting device (1) of the twelfth aspect, since the reporter (20, 100) externally reports that the first or second measuring value is determined to be the abnormal value, it is possible to prompt a user to take some response with respect to occurrence of abnormality in measurement.

A luminaire (200) of a thirteenth aspect includes the lighting device (1) according to any one of the first to the twelfth aspects and a luminaire body (201) holding the lighting device (1).

According to this, it is possible to provide the luminaire (200) including the lighting device (1), which can reduce occurrence of the abnormal control state, even when abnormality occurs in the function of sensing temperature.

A vehicle (300) of a fourteenth aspect includes the luminaire (200) according to the thirteenth aspect and a vehicle body (301) to which the luminaire (200) is attached.

According to this, it is possible to provide the vehicle (300) including the lighting device (1), which can reduce occurrence of the abnormal control state, even when abnormality occurs in the function of sensing temperature.

A control method of a fifteenth aspect is to control power provided to a light source (110). The control method includes: sensing a temperature inside a main body (70) housing a controller (20) and a power converter (10) configured to convert input power to output power to be output to the light source (110); sensing a temperature of the light source (110); controlling the output power of the power converter (10) provided to the light source (110) in accordance with a first predefined relationship when both the temperature inside the main body (70) and the temperature of the light source (110) are not an abnormal value; and controlling the output power of the power converter (10) provided to the light source (110) in accordance with a second predefined relationship when at least one of the temperature inside the main body (70) and the temperature of the light source (110) is the abnormal value.

According to the fifteenth aspect, the output of the power converter (10) is not controlled to the value of the output determined based on the measuring value determined to be the abnormal value. It is accordingly possible to reduce occurrence of an abnormal control state, even when abnormality occurs in the function sensing temperature.

Regarding a control method of a sixteenth aspect, in the fifteenth aspect, when the at least one of the temperature inside the main body (70) and the temperature of the light source (110) is the abnormal value, the output power of the power converter (10) is controlled to be a fixed value which is less than a value of the output power of the power converter (10) is controlled to be when both the temperature inside the main body (70) and the temperature of the light source (110) are not the abnormal value.

According to the sixteenth aspect, when abnormality occurs in the function of sensing temperature, the output of the power converter (10) is reduced. It is therefore possible to suppress increase in temperatures of the lighting device (1) and the light source (110).

A control method of a seventeenth aspect, in the fifteenth or the sixteenth aspect, when determining that one of the temperature inside the main body (70) and the temperature of the light source (110) is the abnormal value, calculating, based on the other of the temperature inside the main body (70) and the temperature of the light source (110), an estimation value of the temperature determined to be the abnormal value; and controlling the value of the output of the power converter (10) based on the estimation value and the other of the temperature inside the main body (70) and the temperature of the light source (110).

According to the seventeenth aspect, it is possible to reduce occurrence of an abnormal control state, even when abnormality occurs in the function sensing temperature.

Regarding a control method of an eighteenth aspect, in any one of the fifteenth to the seventh aspects, whether at least one of the temperature inside the main body (70) and the temperature of the light source (110) is the abnormal value is determined based on whether the temperature inside the main body (70) and the temperature of the light source (110) fall outside respective predefined temperature ranges.

According to the eighteenth aspect, it is possible to reduce occurrence of an abnormal control state, even when abnormality occurs in the function sensing temperature.

Regarding a control method of a nineteenth aspect, in any one of the fifteenth to the eighteenth aspects, whether the at least one of the temperature inside the main body (70) and the temperature of the light source (110) is the abnormal value is determined based on at least one of a ratio and a difference between the temperature inside the main body (70) and the temperature of the light source (110).

According to the nineteenth aspect, it is possible to reduce occurrence of an abnormal control state, even when abnormality occurs in the function sensing temperature.

Regarding a control method of a twentieth aspect, in the eighteenth aspect, a temperature range for the temperature inside the main body (70) in a non-lighting state of the light source (110) is set to be less than that for the temperature inside the main body (70) in a lighting state of the light source (110), and further, a temperature range for the temperature of the light source (110) in the non-lighting state of the light source (110) is set to be less than that for the temperature of the light source (110) in the lighting state of the light source (110).

According to the twentieth aspect, it is possible to reduce occurrence of an abnormal control state, even when abnormality occurs in the function sensing temperature.

An execution subject for executing the control methods according to the fifteenth to twentieth aspects may include a computer system. The computer system may be mainly constituted by a processor as hardware and a memory. The processor may execute a program(s) stored in the memory of the computer system, thereby realizing the function(s) as the execution subject for executing the control methods of the present disclosure. The program(s) may be previously stored in the memory of the computer system, but may be provided via an electric telecommunication line, or may be stored and provided in a computer-readable non-transitory recoding medium, such as a memory card, an optical disk or a hard disk drive. The processor of the computer system may be constituted by one or more electronic circuits including an Integrated Circuit (IC) or a Large Scale Integration (LSI). The electronic circuits may be provided intensively as one chip, or dispersively as two or more chips. The two or more chips may be provided intensively as one device, or dispersively as two or more devices.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
a power converter configured to convert input power to be output to a light source;
a controller configured to control an output of the power converter; and
a main body for housing therein at least the power converter and the controller,
the controller including
a first inputter configured to receive a first measuring value from a first temperature sensor for sensing a temperature inside the main body, and
a second inputter configured to receive a second measuring value from a second temperature sensor for sensing a temperature of the light source,
the controller being configured to control the output of the power converter so as to suppress a value of the output of the power converter in accordance with a first predefined manner over a predefined temperature range when determining that both of the first measuring value and the second measuring value are a normal value and any one of the first measuring value and the second measuring value exceeds a prescribed threshold, and
the controller being configured to control the output of the power converter in accordance with a second predefined manner over the predefined temperature range different from the first predefined manner when determining that at least one of the first measuring value and the second measuring value is an abnormal value.

2. The lighting device according to claim 1, wherein the controller is configured to control the output of the power converter to a fixed value, when determining that at least one of the first measuring value and the second measuring value is the abnormal value.

3. The lighting device according to claim 2, wherein the fixed value is less than the value of the output of the power converter when both of the first measuring value and the second measuring value are the normal value.

4. The lighting device according to claim 1, wherein:
when determining that one of the first measuring value and the second measuring value is the abnormal value, the controller is configured to calculate, based on an other of the first measuring value and the second measuring value, an estimation value of one temperature of the temperature inside the main body of the lighting device and the temperature of the light source, which corresponds to the one of the first measuring value and the second measuring value determined to be the abnormal value; and
the controller is configured to control the value of the output of the power converter based on
the estimation value of the one temperature, which corresponds to the one of the first measuring value and the second measuring value determined to be the abnormal value, and
the other of the first measuring value and the second measuring value.

5. The lighting device according to claim 4, further comprising a memory storing a correlation value, the correlation value representing a correlation between the first measuring value and the second measuring value, obtained in a state where both of the first measuring value and the second measuring value are the normal value, wherein
the controller is configured to calculate the estimation value of the one temperature based on the correlation value in the memory and the other of the first measuring value and the second measuring value.

6. The lighting device according to claim 1, further comprising a communicator configured to receive a third measuring value and a fourth measuring value from another lighting device, the third measuring value being obtained by measuring a temperature inside another main body of the another lighting device, and the fourth measuring value being obtained by measuring a temperature of another light source to be lit by the another lighting device, wherein
when determining that one of the first measuring value and the second measuring value is the abnormal value, the controller is configured to control the value of the output of the power converter based on
one of the third measuring value and the fourth measuring value received by the communicator, which corresponds to the one of the first measuring value and the second measuring value determined to be the abnormal value, and
an other of the first measuring value and the second measuring value.

7. The lighting device according to claim 1, further comprising:
a communicator configured to receive a third measuring value and a fourth measuring value from another lighting device, the third measuring value being obtained by measuring a temperature inside another main body of the another lighting device, and the fourth measuring value being obtained by measuring a temperature of another light source to be lit by the another lighting device; and
a memory storing a correlation value, the correlation value representing a correlation between the first measuring value and the third measuring value, obtained in a state where the first measuring value is the normal value, wherein:

when determining that the first measuring value is the abnormal value, the controller is configured to calculate an estimation value of the temperature inside the main body of the lighting device, using the third measuring value received by the communicator and the correlation value representing the correlation between the first measuring value and the third measuring value in the memory; and the controller is configured to control the value of the output of the power converter based on the second measuring value and the estimation value of the temperature inside the main body of the lighting device.

8. The lighting device according to claim 7, wherein:

the memory further stores another correlation value, the another correlation value representing a correlation between the second measuring value and the fourth measuring value, obtained in a state where the second measuring value is the normal value;

when determining that the second measuring value is the abnormal value, the controller is configured to calculate an estimation value of the temperature of the light source, using the fourth measuring value received by the communicator and the another correlation value representing the correlation between the second measuring value and the fourth measuring value in the memory; and the controller is configured to control the value of the output of the power converter based on the first measuring value and the estimation value of the temperature of the light source.

9. The lighting device according to claim 1, further comprising:

a communicator configured to receive a third measuring value and a fourth measuring value from another lighting device, the third measuring value being obtained by measuring a temperature inside another main body of the another lighting device, and the fourth measuring value being obtained by measuring a temperature of another light source to be lit by the another lighting device; and a memory storing a correlation value, the correlation value representing a correlation between the second measuring value and the fourth measuring value, obtained in a state where the second measuring value is the normal value, wherein:

when determining that the second measuring value is the abnormal value, the controller is configured to calculate an estimation value of the temperature of the light source, using the fourth measuring value received by the communicator and the correlation value representing the correlation between the second measuring value and the fourth measuring value in the memory; and the controller is configured to control the value of the output of the power converter based on the first measuring value and the estimation value of the temperature of the light source.

10. The lighting device according to claim 1, further comprising a communicator configured to output the first measuring value and the second measuring value to an external device.

11. The lighting device according to claim 1, wherein the controller is configured to determine that any one of the first measuring value and the second measuring value is the abnormal value, when being outside of a prescribed temperature range.

12. The lighting device according to claim 1, wherein the controller is configured to determine that the first measuring value or the second measuring value is the abnormal value, when a difference between the first measuring value and the second measuring value is equal to or more than a prescribed reference value for determination.

13. The lighting device according to claim 1, further comprising a reporter configured to externally report that the first measuring value or the second measuring value is determined to be the abnormal value, when the controller determines that at least one of the first measuring value and the second measuring value is the abnormal value.

14. A luminaire, comprising:
the lighting device according to claim 1; and
a luminaire body holding the lighting device.

15. A vehicle, comprising:
the luminaire according to claim 14; and
a vehicle body to which the luminaire is attached.

16. A control method for controlling power provided to a light source, comprising:

sensing a temperature inside a main body housing a controller and a power converter configured to convert input power to output power to be output to the light source;

sensing a temperature of the light source;

controlling the output power of the power converter provided to the light source in accordance with a first predefined manner over a predefined temperature range when both the temperature inside the main body and the temperature of the light source are a normal value; and controlling the output power of the power converter provided to the light source in accordance with a second predefined manner over the predefined temperature range when at least one of the temperature inside the main body and the temperature of the light source is an abnormal value.

17. The control method according to claim 16, wherein when the at least one of the temperature inside the main body and the temperature of the light source is the abnormal value the output power of the power converter is controlled to be a fixed value which is less than a value of the output power of the power converter is controlled to be when both the temperature inside the main body and the temperature of the light source are a normal value.

18. The control method according to claim 16, wherein:

when determining that one of the temperature inside the main body and the temperature of the light source is the abnormal value, calculating, based on the other of the temperature inside the main body and the temperature of the light source, an estimation value of the temperature determined to be the abnormal value; and controlling the value of the output of the power converter based on the estimation value and the other of the temperature inside the main body and the temperature of the light source.

19. The control method according to claim 16, wherein whether at least one of the temperature inside the main body and the temperature of the light source is the abnormal value is determined based on whether the temperature inside the main body and the temperature of the light source fall outside respective predefined temperature ranges.

20. The control method according to claim 16, wherein whether the at least one of the temperature inside the main body and the temperature of the light source is the abnormal value is determined based on at least one of a ratio and a difference between the temperature inside the main body and the temperature of the light source.

* * * * *